Aug. 23, 1932.   A. W. KIMBELL   1,873,895
NUT AND NUT AND SCREW FASTENED INSTALLATION
Filed Aug. 1, 1931

Inventor:
Arthur W. Kimbell
by Emery, Booth, Varney & Townsend
Att'ys

Patented Aug. 23, 1932

1,873,895

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

NUT AND NUT AND SCREW FASTENED INSTALLATION

Original application filed April 27, 1931, Serial No. 533,080. Divided and this application filed August 1, 1931. Serial No. 554,437.

My invention aims to provide improvements in nuts and nut and screw fastened installations and also the method of making the nuts.

This application is a divisional of my application Serial No. 533,080, filed April 27, 1931.

In the drawing which illustrates a preferred embodiment of my invention:—

Referring to my invention as illustrated by the annexed drawing there is shown an improved nut member for nut and screw fastened installations. The nut illustrated is pressed from a single piece of sheet metal and has a base flange 1 from which extends a hollow shank 2. Any suitable means may be provided for preventing rotation of the nut when attached to a part of an installation, but I have shown a number of cone-shaped projections 3 for this purpose. The cone-shaped projections 3 are pressed from the material of the base and spaced inwardly from the periphery thereof so that the nut may be made from a minimum sized blank.

Figure 3:
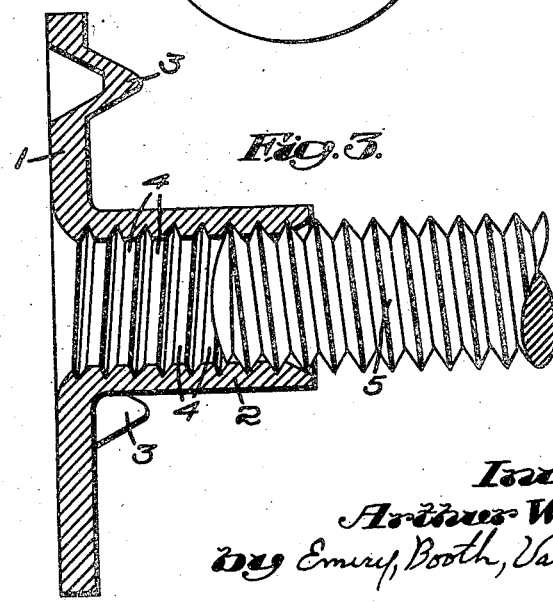
Fig. 3 is an enlarged cross-sectional view through my improved nut member, a portion of an attaching screw being shown in elevation.

Heretofore nut members of the general type referred to above have been used in which the shanks were threaded internally with an ordinary V-type thread for cooperation with the threaded shank of an attaching screw. I have found that in nut members wherein the shank is of substantial length and drawn from the material of the base the ordinary V-type thread extends so nearly entirely through the wall of the shank that it is weakened to such an extent that the shank breaks when a substantial axial stress is exerted thereupon. Since the thickness of the wall of the shank cannot be increased for several obvious reasons, I propose to strengthen the shank by decreasing the distance that the thread is cut into the shank, as shown in Fig. 3. I have found that I can provide a thread 4 internally of the shank 2 and which will extend not more than half way through the thickness of the wall of the shank by using a tap of such size that only about one-half of the depth of a standard V-shaped thread will be cut into the wall of the shank, as shown in Fig. 3. Therefore, I have provided a thread which has a flat face of substantial width at the inner face of the shank 2 which is adapted to cooperate with a standard V-shaped thread on the shank 5 of the attaching screw 6. If desirable, the shank 5 of the screw may be provided with a thread which is the same shape as the thread 4 formed in the shank 2 of the nut.

As a result of my invention I have provided a nut which is adapted to cooperate with a standard screw but which has a shank threaded as described above so that there is sufficient unthreaded material between the outer face of the shank and the bottom of the thread 4 to prevent fracture or complete breakage of the shank 2 when substantial stresses are exerted upon the shank through the screw. While there is not as much contact between the surfaces of the thread 4 of the shank of the nut and the surfaces of the thread of the shank of the screw (Fig. 3) as there would be by providing a full V-shaped thread in the shank of the nut, nevertheless, I have found that the length of the shank 2 of the nut, as illustrated in the drawing, is more than sufficient to provide an interengagement of the threads sufficient to withstand any normal axial stresses which would tend to strip the threads from either the shank of the screw or the shank of the nut. I have, therefore, increased the strength of the shank of the nut without affecting the practical interlocking engagement between the thread of the shank of the nut and the thread of the shank of the screw so that with my improved nut member it may be used in ordinary installations without destruction and may be used in many instances where the same type of nut having a full V-shaped thread would fail for reasons as set forth above.

Figure 1:
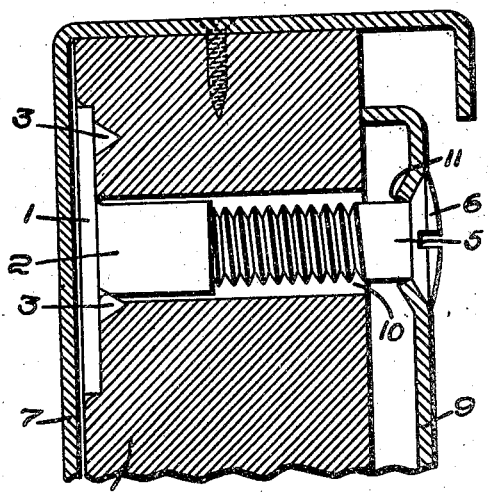
Figure 1 is a section through a portion of an installation showing my invention in use.
Figure 2:
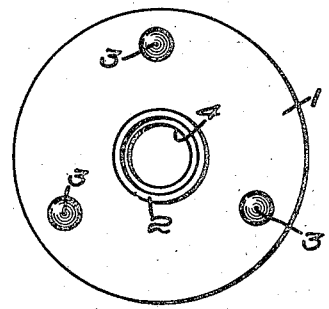
Fig. 2 is an end elevation of my improved nut member.

One use in which my improved nut member has now become a standard practice with some motor vehicle manufacturers is that of securing members to the lock board attached to the door of a motor vehicle. In Fig. 1 I have shown a portion of this type of installation which includes the sheet metal door 7, the wooden lock board 8 secured within the door 7 and a part 9, which may be the remote control handle device, the window regulator, or other part attached to the lock board 8. In this particular installation, the shank 2 of the nut extends into a bore 10 in the board 8 and the screw 6 extends through an aperture 11 in the part 9 and engages with the shank of the nut. As the nut and screw are threaded together, the projections 3 on the base of the nut are forced into the wooden board 8, thereby preventing rotation of the nut. If the board 8 is of soft wood the tightening of the screw will countersink the base 1 into the wood, as shown in Fig. 1, so that when the board 8 is placed in the door 7 there need be little or no space between the door and the lock board.

From an inspection of Fig. 3 it is apparent that the pitch of the thread 4 of the shank 2 of the nut is at least twice as great as the height of the thread. This provides strength against axial stresses tending to strip the thread. It is also apparent that the flat top of the thread 4 is about equal to the height of the thread. This gives a strong thread and aids against stripping. I do not wish to be limited to the dimensions shown and described because they may be varied to some degree depending upon the use of the nut and the stresses to which it may be subjected. The proportions given for the thread 4 and the thickness of the unthreaded portion of the wall of the shank 2 have been tried and found practical and nuts of this construction are in commercial use and are proving very satisfactory.

While I have illustrated and described a preferred embodiment of my invention, I do not wish to be limited thereby, because the scope of my invention is best defined by the following claims.

Claims:

1. A sheet metal nut having a base, a hollow relatively thin walled shank extending from said base and a thread formed internally of said shank, said thread having a substantially wide flat face throughout its length at the inner surface of said shank and being otherwise of the conventional high pitched V-shaped type cut only part way into the thickness of the wall of the shank, thereby leaving an unthreaded thickness of the wall which is greater than would be provided by cutting the thread in the conventional manner.

2. A sheet metal nut having a base, a hollow shank drawn from the metal of said base and a thread formed internally of said shank, the internal portion of said thread being of the sharp V-type but cut into the wall only to such a depth as to provide a blunt top at the inner face of the shank, the width of said top being about equal to the height of the thread from top to bottom.

In testimony whereof, I have signed my name to this specification.

ARTHUR W. KIMBELL.